(12) United States Patent
Zhu

(10) Patent No.: US 12,467,466 B1
(45) Date of Patent: Nov. 11, 2025

(54) FOLDABLE HANDHELD FAN

(71) Applicant: Guangdong Aoyun Technology Co., Ltd., Guangdong (CN)

(72) Inventor: Xueping Zhu, Guangdong (CN)

( * ) Notice: Subject to any disclaimer, the term of this patent is extended or adjusted under 35 U.S.C. 154(b) by 0 days.

(21) Appl. No.: 19/078,807

(22) Filed: Mar. 13, 2025

(30) Foreign Application Priority Data

Jan. 24, 2025 (CN) .......................... 202520173658.6

(51) Int. Cl.
| | |
|---|---|
| *F04D 25/08* | (2006.01) |
| *F04D 19/00* | (2006.01) |
| *F04D 25/06* | (2006.01) |
| *F04D 29/52* | (2006.01) |
| *F21V 33/00* | (2006.01) |

(52) U.S. Cl.
CPC ......... *F04D 25/084* (2013.01); *F04D 19/002* (2013.01); *F04D 25/0673* (2013.01); *F04D 29/522* (2013.01); *F21V 33/0096* (2013.01)

(58) Field of Classification Search
None
See application file for complete search history.

(56) References Cited

U.S. PATENT DOCUMENTS

D997,334 S * 8/2023 Zhu .............................. D23/382
2024/0229809 A1 * 7/2024 Zheng .................. F04D 29/547

OTHER PUBLICATIONS

Tan (CN 222185142 U) + machine translation (Year: 2024).*
Cao (CN 221591270 U) + machine translation (Year: 2024).*
Akemoto (JP 2023008716 A) + machine translation (Year: 2023).*

* cited by examiner

*Primary Examiner* — Juan G Flores
(74) *Attorney, Agent, or Firm* — Hemisphere Law, PLLC; Zhigang Ma

(57) ABSTRACT

A foldable handheld fan includes a fan main body, a fan head connected to the fan main body, and a connecting component installed on the fan main body. The connecting component is provided with a storage space. The storage space is positioned above the fan main body. The fan head is rotatably connected to the connecting component. The fan head includes a storage state and a working state. In the storage state, at least one part of the fan head is stored in the storage space. The fan head is also rotatable relative to the connecting component in the storage state to enter the working state. In the working state, the fan head is capable of blowing air outwards.

17 Claims, 12 Drawing Sheets

FOLDABLE HANDHELD FAN

CROSS-REFERENCE TO RELATED APPLICATIONS

The application claims priority of Chinese patent application CN2025201736586, filed on Jan. 24, 2025, which is incorporated herein by reference in its entireties.

TECHNICAL FIELD

The present invention relates to the technical field of fans, particularly to a foldable handheld fan.

BACKGROUND ART

A fan is a tool used in summer to generate air and cool down. As the temperature rises, the demand for fans is increasing. With the development of technology, small handheld fans have emerged. The handheld fans are portable and widely loved by people.

However, existing handheld fans have some problems, such as large volume, large space occupation, inconvenient storage, high manufacturing cost, difficult assembly, and single fixing method.

SUMMARY

In order to solve the problems of large volume, large space occupation, inconvenient storage, high manufacturing cost, difficult assembly, and single fixing method of handheld fans in the prior art mentioned above, the present invention adopts the following technical solution to solve the technical problems.

A foldable handheld fan includes a fan main body, a fan head connected to the fan main body, and a connecting component installed on the fan main body. The connecting component is provided with a storage space. The storage space is positioned above the fan main body. The fan head is rotatably connected to the connecting component. The fan head includes a storage state and a working state. In the storage state, at least one part of the fan head is stored in the storage space. The fan head is also rotatable relative to the connecting component in the storage state to enter the working state. In the working state, the fan head is capable of blowing air outwards.

Beneficial effects of the present invention are as follows. The foldable handheld fan includes the fan main body, the fan head connected to the fan main body, and the connecting component installed on the fan main body. The connecting component is provided with the storage space. The storage space is positioned above the fan main body. The fan head is rotatably connected to the connecting component. The fan head includes the storage state and the working state. In the storage state, at least one part of the fan head is stored in the storage space. The fan head is also rotatable relative to the connecting component in the storage state to enter the working state. In the working state, the fan head is capable of blowing air outwards. The storage space can be simultaneously used for storing the fan head and for allowing the fan head to rotate and work, thereby making the foldable handheld fan more compact as a whole and optimized in design, and further ensuring structural compactness.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
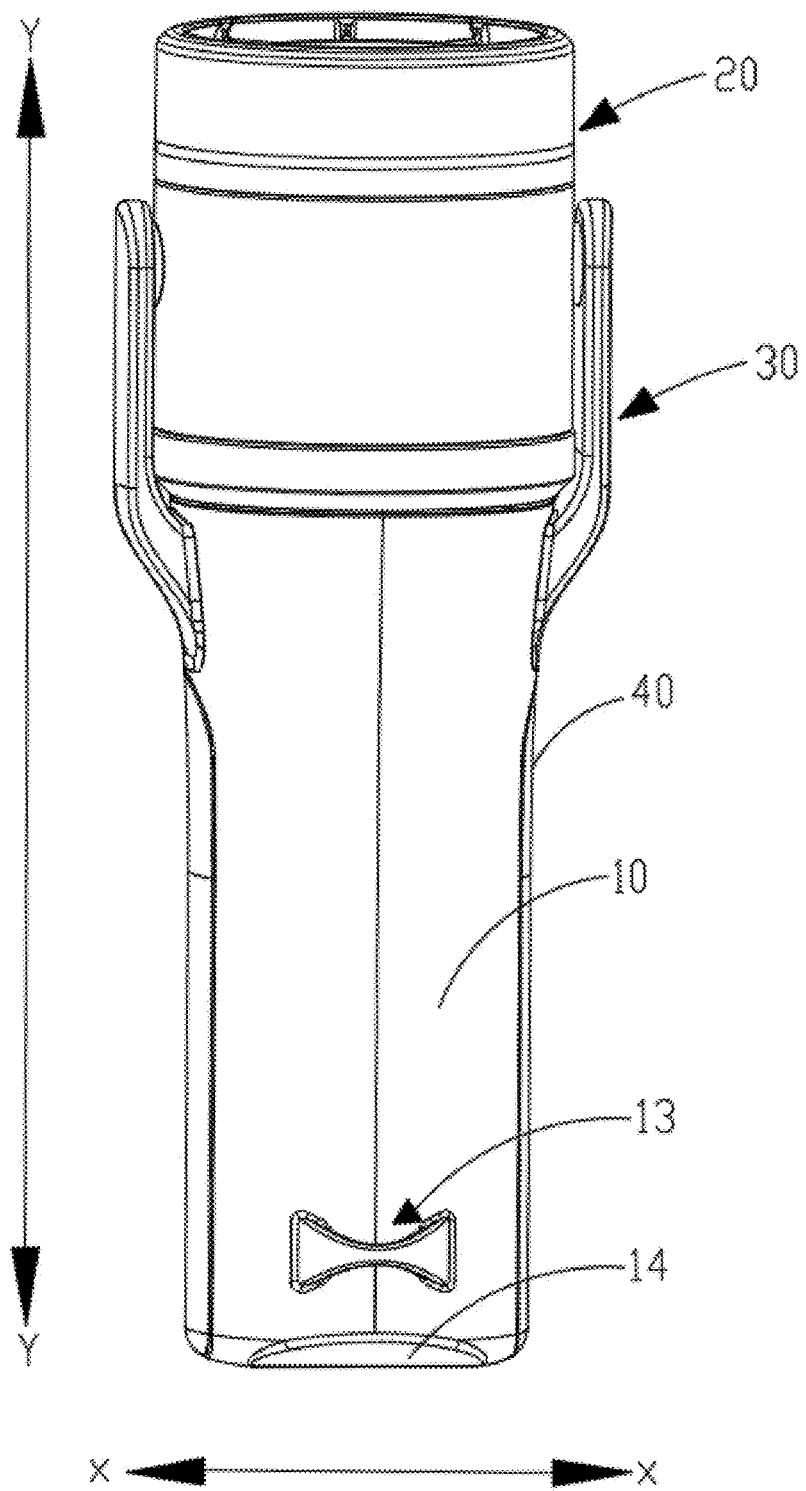
FIG. 1 is a schematic structural diagram of a foldable handheld fan in a storage state from one angle of view according to the present invention.
Figure 2:
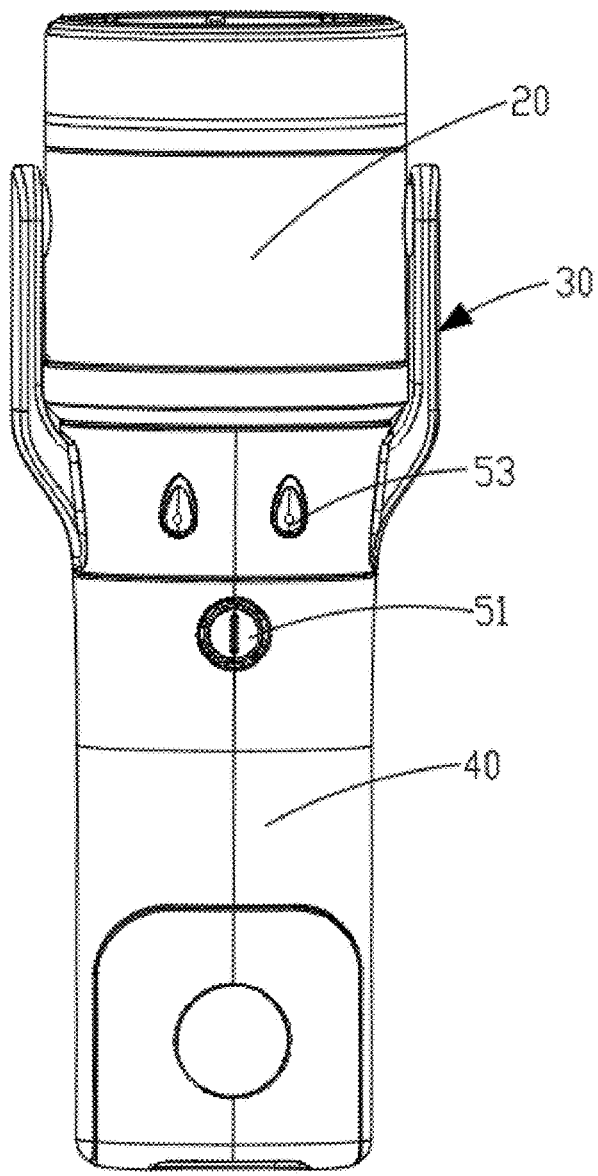
FIG. 2 is a schematic structural diagram of a foldable handheld fan in a storage state from another angle of view according to the present invention.
Figure 3:
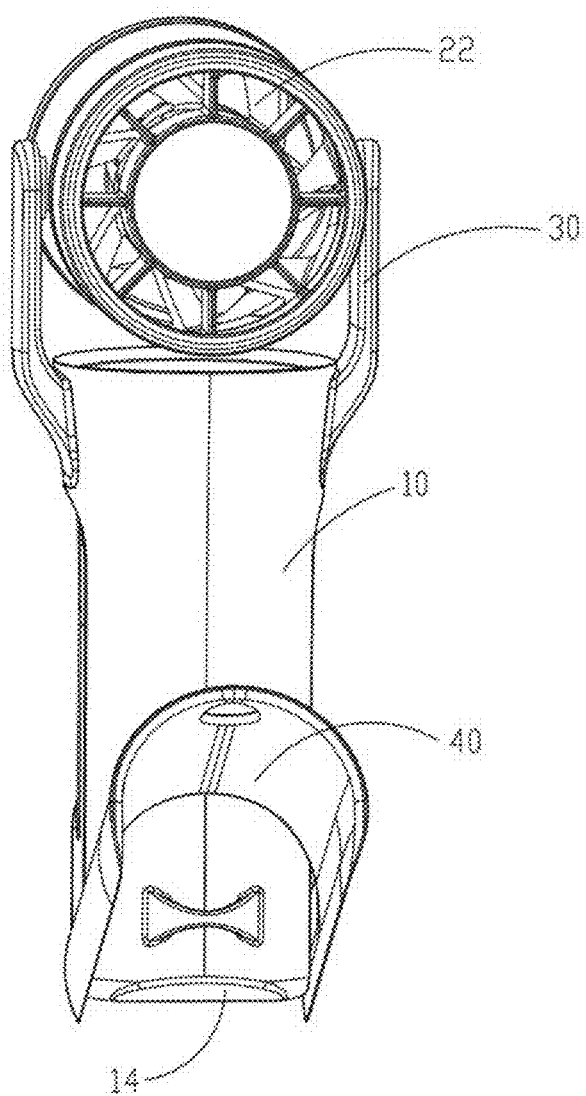
FIG. 3 is a schematic structural diagram of a foldable handheld fan in a working state from one angle of view according to the present invention.
Figure 4:
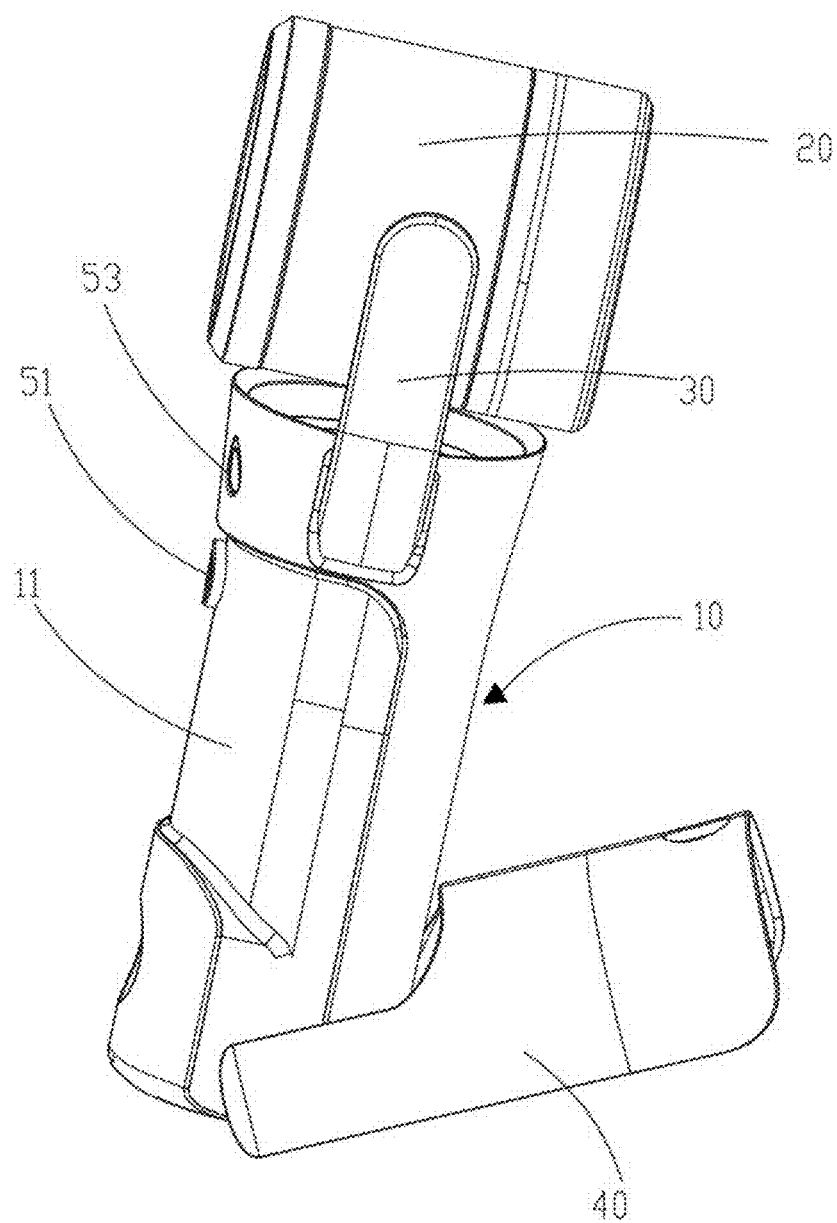
FIG. 4 is a schematic structural diagram of a foldable handheld fan in a working state from another angle of view according to the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIGS. 1-13, a foldable handheld fan provided in the present invention includes a fan main body 10, a fan head 20 connected to the fan main body 10, and a connecting component 30 installed on the fan main body 10. The connecting component 30 is provided with a storage space 31. The storage space 31 is positioned above the fan main body 10. The fan head 20 is rotatably connected to the connecting component 30. The fan head 20 includes a storage state and a working state. In the storage state, at least one part of the fan head 20 is stored in the storage space 31. The fan head 20 is also rotatable relative to the connecting component 30 in the storage state to enter the working state. In the working state, the fan head 20 is capable of blowing air outwards.

In this embodiment, the fan head 20 is rotatably connected to the connecting component 30 and has two states. In the storage state, the fan head 20 is stored in the storage space 31 and is arranged at an included angle of 0 degrees with the fan main body to achieve storage. When the user needs to use the foldable handheld fan to blow air, the fan head 20 is rotated, and the fan head 20 is in the storage space 31 and rotates around the connecting component 30, so that the fan head 20 enters the working state from the storage state. In the working state, the fan head 20 is capable of blowing outwards. At this time, the fan head 20 and the fan main body 10 form an included angle that is not 0 degrees. In the working state, the included angle between the fan main body 10 and the fan head 20 is in a range between 0 degrees (excluding) and 90 degrees (including), thus meeting the user's angle adjustment needs.

In this embodiment, the storage space 31 can be simultaneously used for storing the fan head 20 and for allowing the fan head 20 to rotate and work, thereby making the foldable handheld fan more compact as a whole and optimized in design. The storage space 31 is positioned in a first direction Y-Y (i.e. a height direction) of the fan main body 10, thereby reducing a height of the foldable handheld fan, and further ensuring structural compactness.

Figure 5:
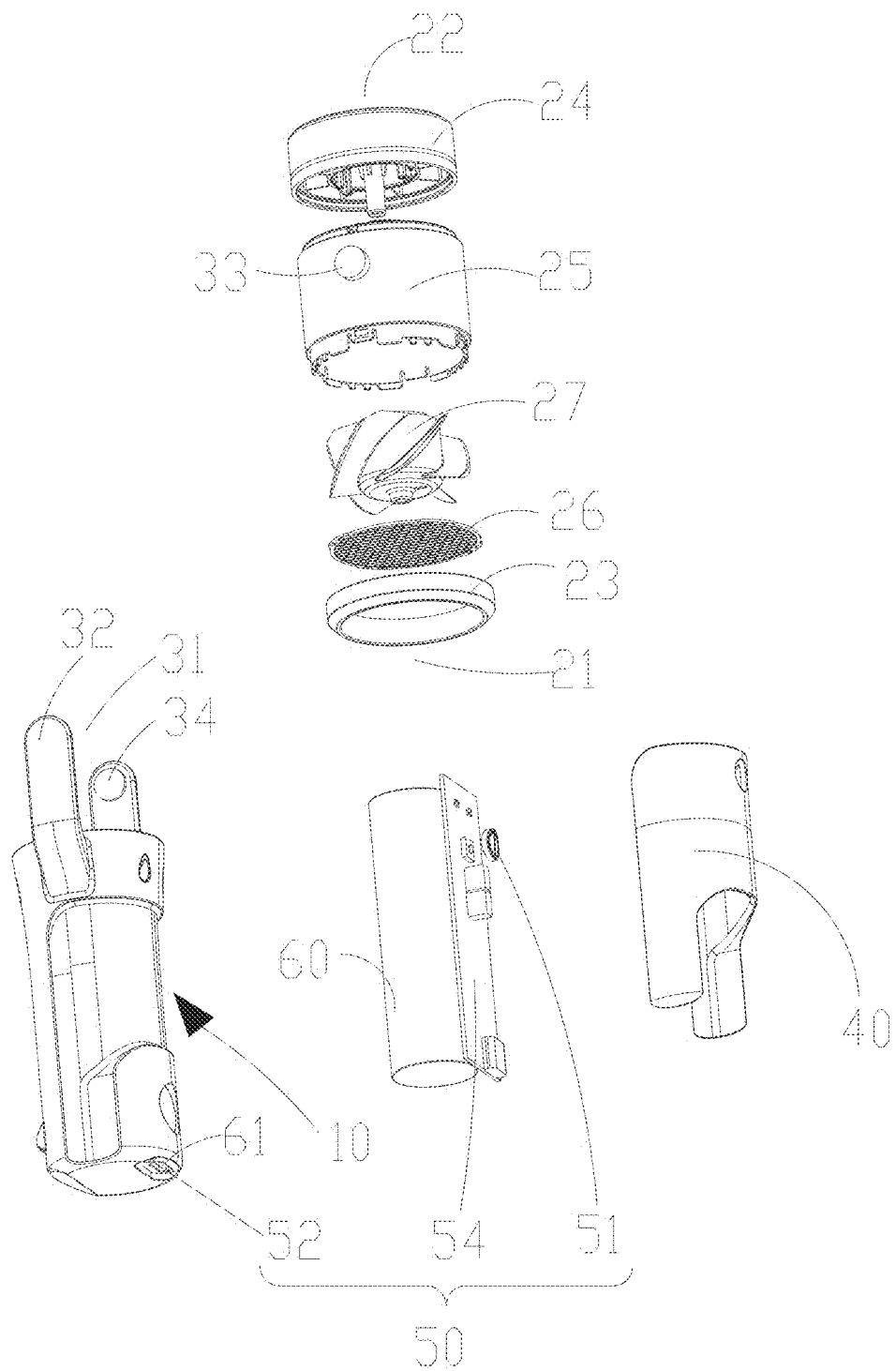
FIG. 5 is an exploded view of a foldable handheld fan according to the present invention.

Referring to FIG. 5, as an embodiment, the connecting component 30 includes two connecting arms 32 installed on the fan main body 10. The two connecting arms 32 are arranged opposite each other. The two connecting arms 32 and the fan main body 10 form the storage space 31. One of the connecting arm 32 and the fan head 20 is provided with a connecting member 33, and the other of the connecting arm 32 and the fan head 20 is provided with a connecting hole 34. The connecting member 33 penetrates into the connecting hole 34, so that the connecting arm 32 and the fan head 20 are rotatably connected.

Specifically, the connecting component 30 includes two connecting arms 32. The two connecting arms 32 are installed on the fan main body 10 along the first direction. The fan head 20 is movably connected to free ends of the two connecting arms 32. The two connecting arms 32 and the fan main body 10 form the storage space 31. One of the fan head 20 and the connecting component 30 is provided with the connecting member 33 in a second direction X-X (i.e. a length direction), and the other of the fan head 20 and the connecting component 30 is provided with the connecting hole 34. The connecting member 33 penetrates into the connecting hole 34, so that the connecting arm 32 and the fan head 20 are rotatably connected. By configuring the connecting member 33 and the connecting hole 34, it is ensured that the fan head 20 is rotatable smoothly.

Referring to FIG. 5, the fan head 20 is provided with an air inlet opening 21 and an air blowing opening 22 in communication with the air inlet opening 21. In the storage state, the air inlet opening 21, the air blowing opening 22, and the fan main body 10 are positioned on an identical axis. The axis extends along the first direction. The air inlet opening 21 is close to the fan main body 10, and the air blowing opening 22 is far away from the fan main body 10. The air inlet opening 21, the air blowing opening 22, and the fan main body 10 are positioned on an identical axis, that is, the fan main body 10 and the fan head 20 form an included angle of 0 degrees, thereby ensuring that the fan occupies less space after storage and is convenient for storage and placement.

Referring to FIG. 5, FIG. 7, FIG. 8, and FIG. 11, the fan head 20 at least includes a first shell 23 and a second shell 24 connected to the first shell 23. The air inlet opening 21 is positioned in the first shell 23, and the air blowing opening 22 is positioned in the second shell 24. In this embodiment, the fan head 20 is split into the first shell 23 and the second shell 24, so as to facilitate assembly after installing a fan blade component 27 inside the fan head 20, thereby reducing assembly difficulty, improving assembly efficiency, and reducing manufacturing costs.

Figure 8:
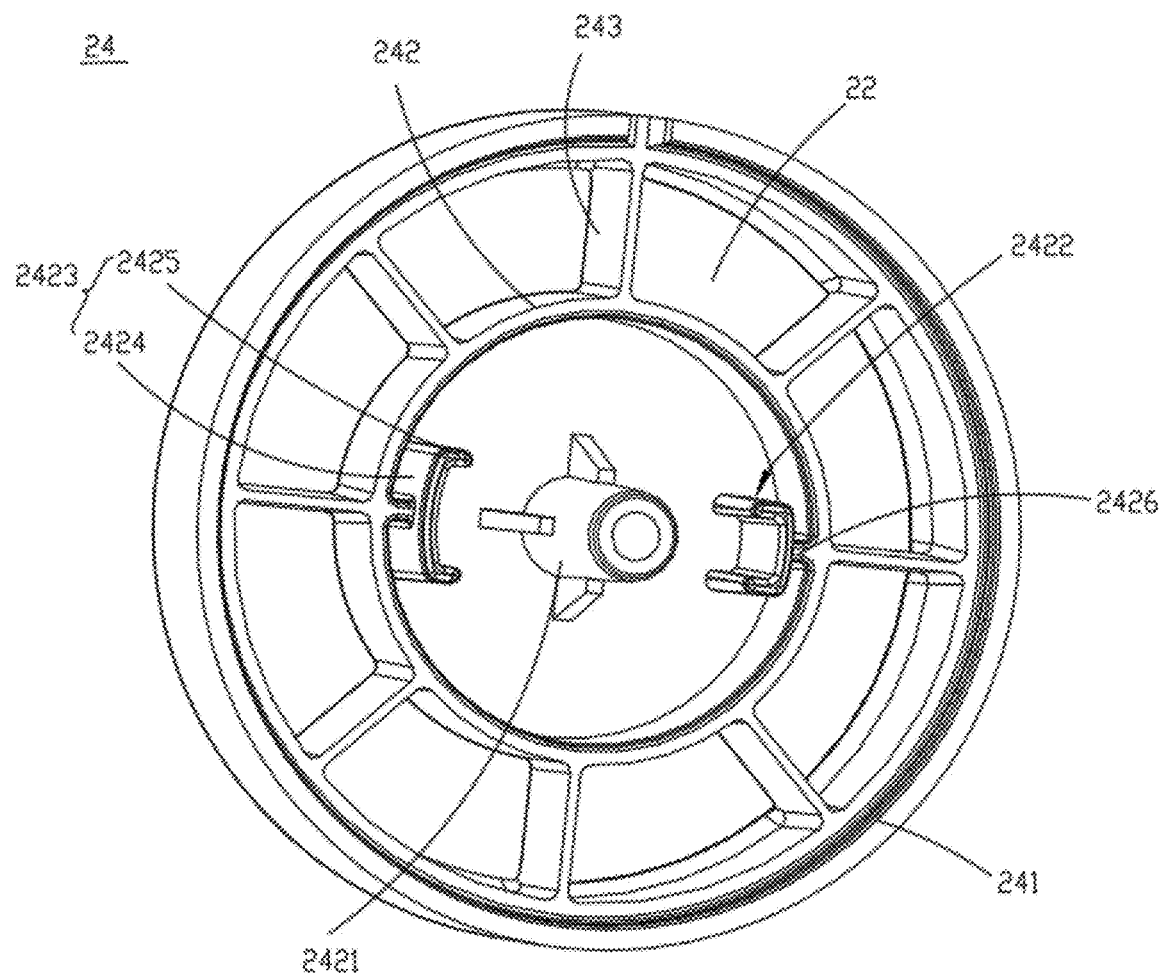
FIG. 8 is a schematic structural diagram of a second shell of a foldable handheld fan according to the present invention.
Figure 9:
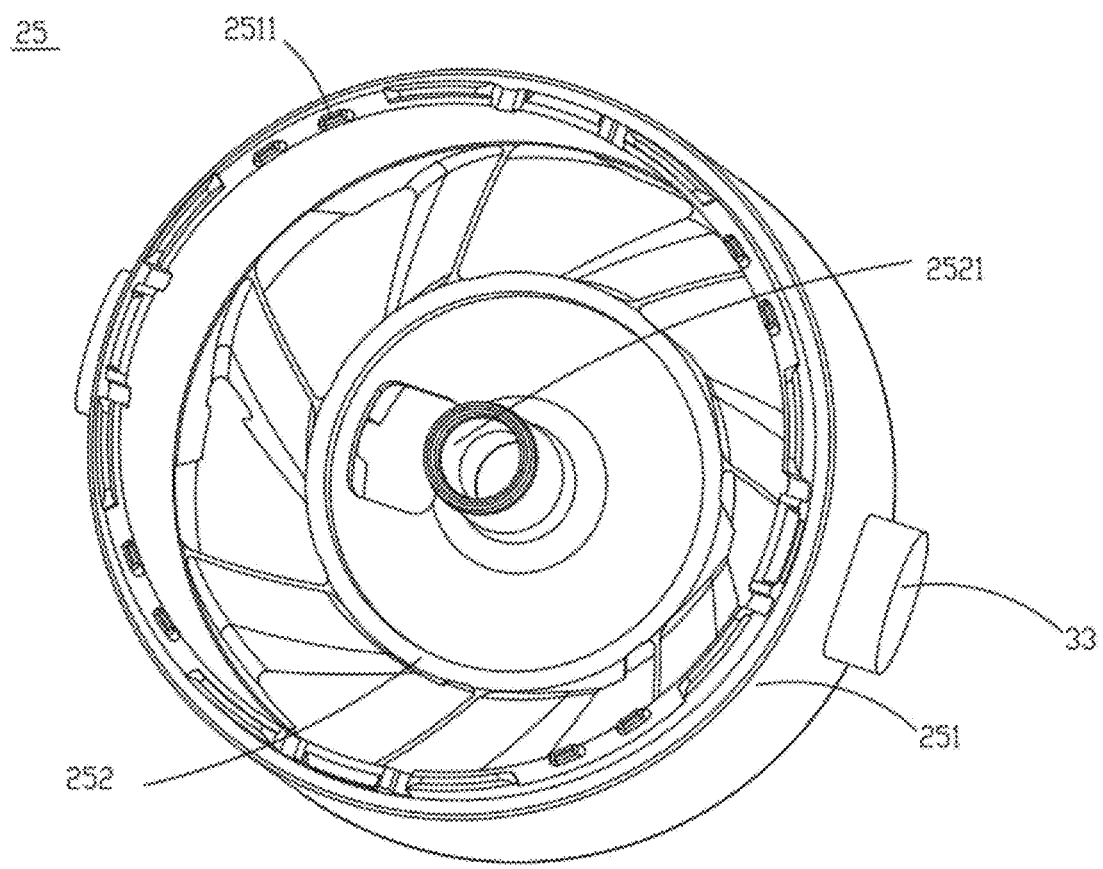
FIG. 9 is a schematic structural diagram of a third shell of a foldable handheld fan in one direction according to the present invention.

Referring to FIG. 5 and FIG. 8, the second shell 24 includes a second outer shell 241 and a second inner shell 242. The second outer shell 241 is hollow, and the second inner shell 242 is positioned inside the second outer shell 241. The second inner shell 242 and the second outer shell 241 are connected by a plurality of isolation members 243. The second inner shell 242, the second outer shell 241, and adjacent two of the isolation members 243 form one air blowing opening 22. In this embodiment, the second outer shell 241 is hollow for the placement of the second inner shell 242. The second inner shell 242, the second outer shell 241, and adjacent two of the isolation members 243 form one air blowing opening 22, which can ensure the normal blowing work of the foldable handheld fan, and can also reduce the weight of the foldable handheld fan.

Referring to FIGS. 5-10, the fan head 20 further includes a third shell 25 installed between the first shell 23 and the second shell 24. The third shell 25 includes a third outer shell 251 and a third inner shell 252. The third outer shell 251 is hollow, and the third inner shell 252 is positioned inside the third outer shell 251. The third inner shell 252 and the third outer shell 251 are connected by the plurality of isolation members 243. The third inner shell 252, the third outer shell 251, and adjacent two of the isolation members 243 form one air blowing opening 22. The air blowing opening 22 in the second shell 24 is defined opposite to the air blowing opening 22 in the third shell 25. In this embodiment, by arranging the first shell 23, the second shell 24, and the third shell 25, the entire shell is divided into a plurality of shells, which can facilitate manufacturing. The third inner shell 252, the third outer shell 251, and adjacent two of the isolation members 243 form one air blowing opening 22 to blow air toward the user for cooling. The use of the isolation members 243 can also reduce the weight of the foldable handheld fan. An inner side surface of the third outer shell 251 is an inclined surface or a curved surface, so that an inner diameter of the third outer shell 251 gradually decreases along a direction from the air inlet opening 21 to the air blowing opening 22, thereby making the air blown out pressurized, and increasing intensity of air blowing out.

Referring to FIGS. 5-11, the fan head 20 further includes a fan blade component 27. The fan blade component 27 is provided with a blade fixing column. A surface of the second inner shell 242 extends towards a direction of the third inner shell 252 to form a second fixing member 2421. The third inner shell 252 is provided with a third fixing hole 2521. The second fixing member 2421 penetrates into the third fixing hole 2521. The blade fixing column passes through the third fixing hole 2521 and is connected to the second fixing member 2421. In this embodiment, the second fixing member 2421 penetrates into the third fixing hole 2521. The blade fixing column passes through the third fixing hole 2521 and is connected to the second fixing member 2421, so that the third shell 25, the second shell 24, and the fan blade component 27 are assembled together, making assembly simple. The fan blade component 27 includes a motor 270 and a fan blade 271. The motor 270 drives the fan blade 271 to rotate, thereby blowing air to the user for cooling.

The second inner shell 242 is equipped with a second positioning component 2422. The third inner shell 252 is equipped with a third positioning component 2522. The second positioning component 2422 is inserted into the third positioning component 2522, so as to limit axial rotation of the second inner shell 242 relative to the third inner shell 252. In this embodiment, the second positioning component 2422 is inserted into the third positioning component 2522, so as to achieve the assembly of the third shell 25 and the second shell 24 together, thereby making the assembly simple and stable. Furthermore, the second fixing member 2421 is inserted into the third fixing hole 2521, so that the third shell 25 and the second shell 24 are first assembled together. The second positioning component 2422 is inserted into the third positioning component 2522, so that the third shell 25 and the second shell 24 are limited to rotate relative to an axis, thereby achieving stable assembly.

The second positioning component 2422 includes two second positioning members 2423. The two second positioning members 2423 are symmetrically arranged on both sides of the second fixing member 2421. In this embodiment, the symmetrical arrangement of the two second positioning members 2423 can ensure force balance and avoid local stress concentration, thereby improving the overall stability and durability of the second shell 24 and the third shell 25, and further improving the processing quality of the product.

The second positioning member 2423 is U-shaped, and an opening of the second positioning member 2423 is oriented towards the second fixing member 2421. In this embodiment, the U-shaped second positioning member 2423 is high in strength, good in rigidity, small in deformation and convenient to install. Specifically, the second positioning member 2423 includes a second bottom plate 2424 connected to an inner wall of the second inner shell 242, and two second side plates 2425 installed at both ends of the second bottom plate 2424. The two second side plates 2425 and the second bottom plate 2424 form the U-shaped second positioning member 2423.

The third positioning component 2522 includes two third positioning members 2523. The two third positioning members 2523 are symmetrically arranged on both sides of the third fixing hole 2521. In this embodiment, the symmetrical arrangement of the two third positioning members 2523 can ensure force balance and avoid local stress concentration, thereby improving the overall stability and durability of the second shell 24 and the third shell 25, and further improving the processing quality of the product.

The second outer shell 241 is provided with a second step, and the third outer shell 251 is provided with a third protrusion. The second step cooperates with the third protrusion to connect the second outer shell 241 and the third outer shell 251.

Referring to FIG. 7 to FIG. 10, the third positioning member 2523 is U-shaped, and an opening of the third positioning member 2523 is oriented towards the third inner shell 252. In this embodiment, the U-shaped third positioning member 2523 is high in strength, good in rigidity, small in deformation and convenient to install. Specifically, the third positioning member 2523 includes a third bottom plate 2524 and two third side plates 2525. One side of each of the two third side plates 2525 is connected to the third bottom plate 2524, and an opposite side of each of the two third side plates 2525 is connected to the third inner shell 252.

The second side plate 2425 is connected to the second inner shell 242 through a second positioning block 2426. An avoidance notch 2526 is defined in the third inner shell 252. The avoidance notch 2526 is used for assembly of the second positioning block 2426. In this embodiment, the second positioning block 2426 extends along an inner wall of the second inner shell 242 towards a direction of the second fixing member 2421. The avoidance notch 2526 is used for the assembly of the second positioning block 2426, which can ensure better stability after assembly. Specifically, the third inner shell 252 is provided with a third platform, and an edge of the third platform protrudes towards a direction of the second shell 24 to form a third inner protruding platform. The third inner protruding platform is provided with a notch at a position corresponding to the third positioning member 2523 to form the avoidance notch 2526. In this embodiment, through the cooperation of the second positioning member 2423 and the third positioning member 2523, and the cooperation of the second positioning block 2426 and the avoidance notch 2526, the second shell 24 and the third shell 25 can be better fixed.

Figure 7:
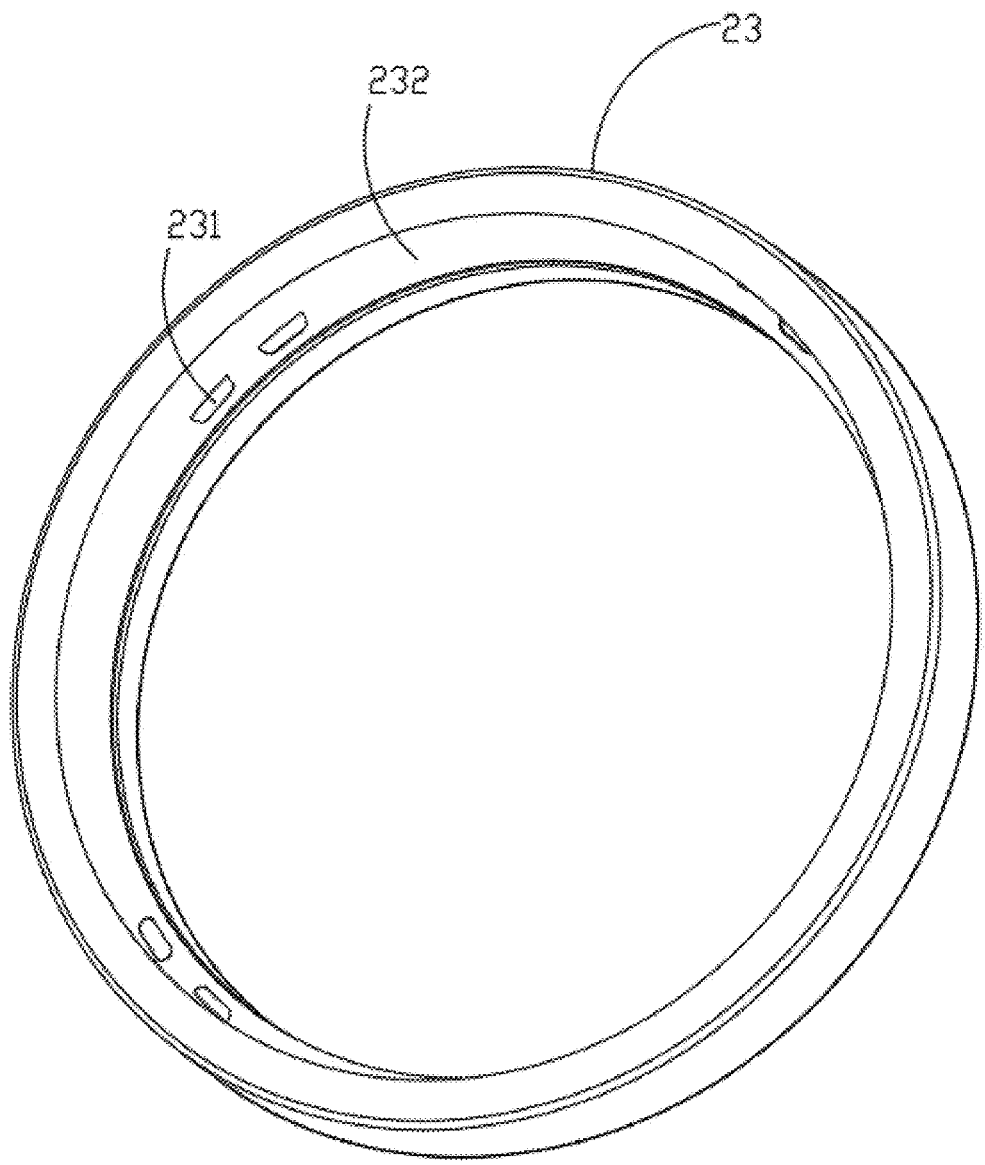
FIG. 7 is a schematic structural diagram of a first shell of a foldable handheld fan according to the present invention.
Figure 10:
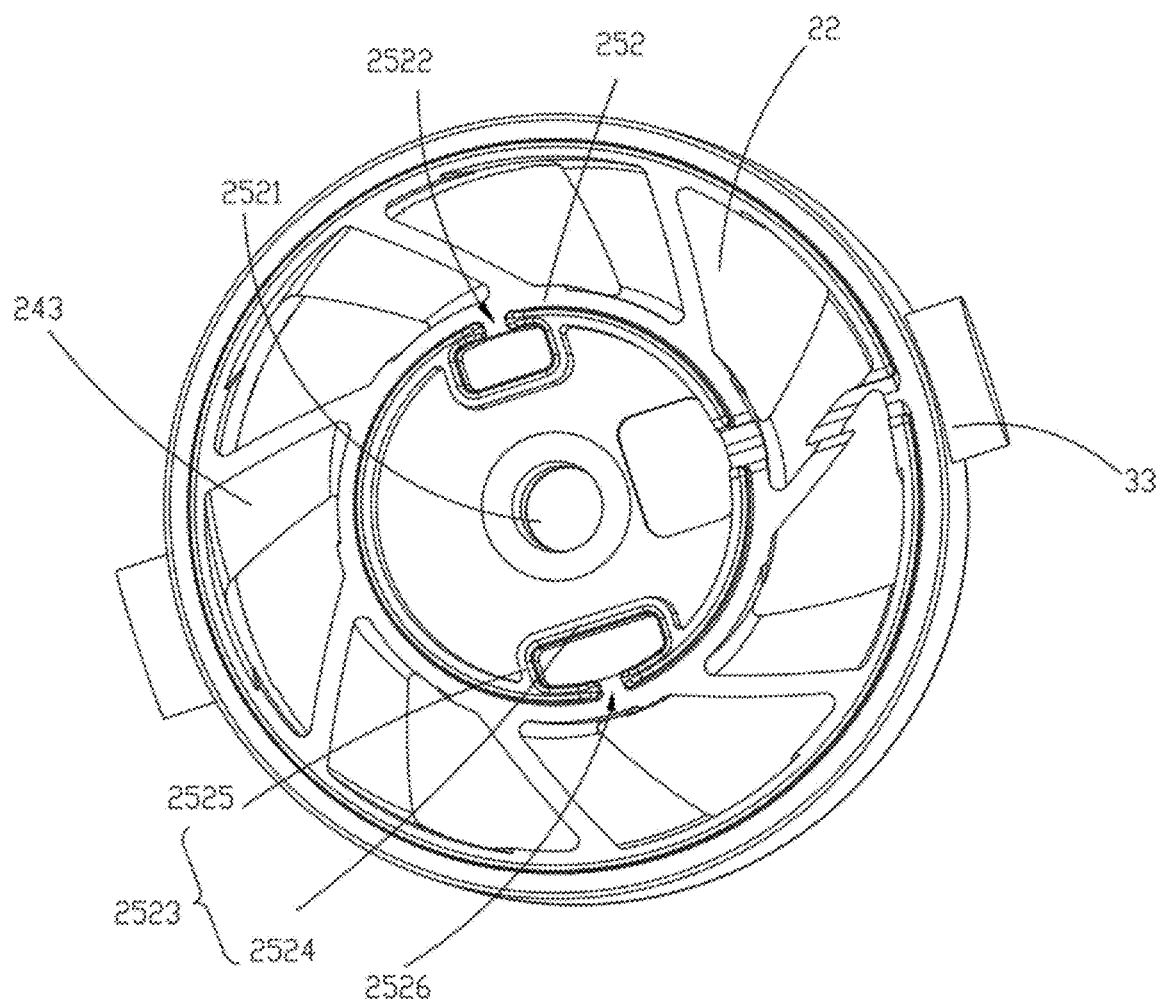
FIG. 10 is a schematic structural diagram of a third shell of a foldable handheld fan in another direction according to the present invention.
Figure 11:
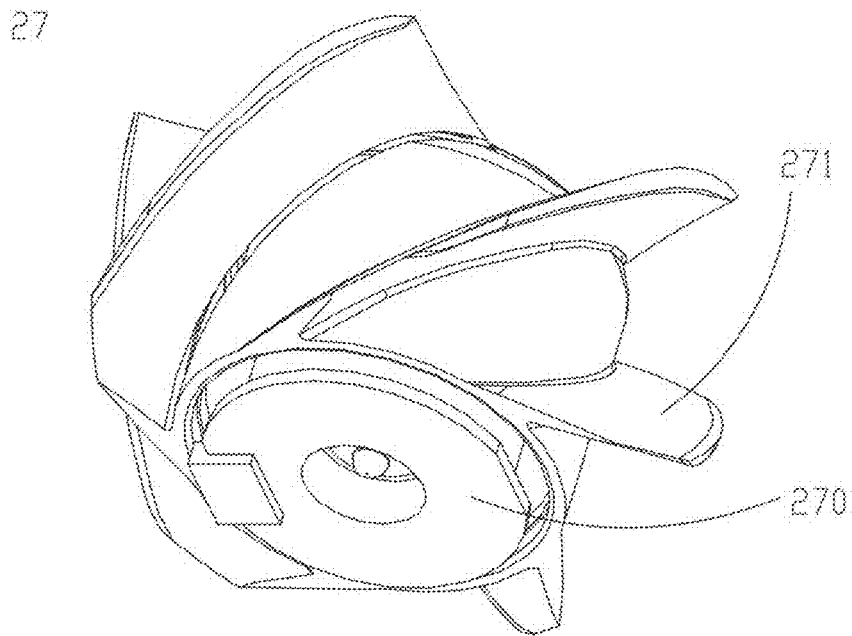
FIG. 11 is a schematic structural diagram of a fan blade component of a foldable handheld fan according to the present invention.

Referring to FIG. 7 and FIG. 10, the third outer shell 251 is provided with a plurality of serrations 2511 on one side facing the first shell 23. The first shell 23 is provided with first through holes 231 cooperating with the serrations 2511. The serrations 2511 are engaged with the first through holes 231. In this embodiment, through the cooperation between the serrations 2511 and the first through holes 231, the third outer shell 251 of the third shell 25 and the first shell 23 can be quickly engaged together, which facilitates assembly.

Figure 6:
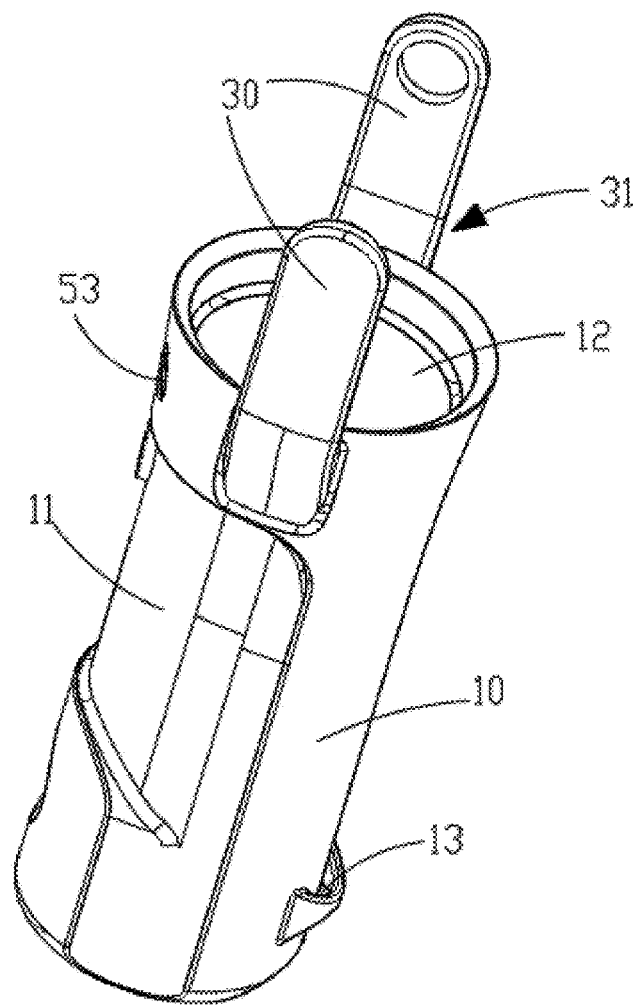
FIG. 6 is a schematic structural diagram of a fan main body of a foldable handheld fan according to the present invention.
Figure 12:
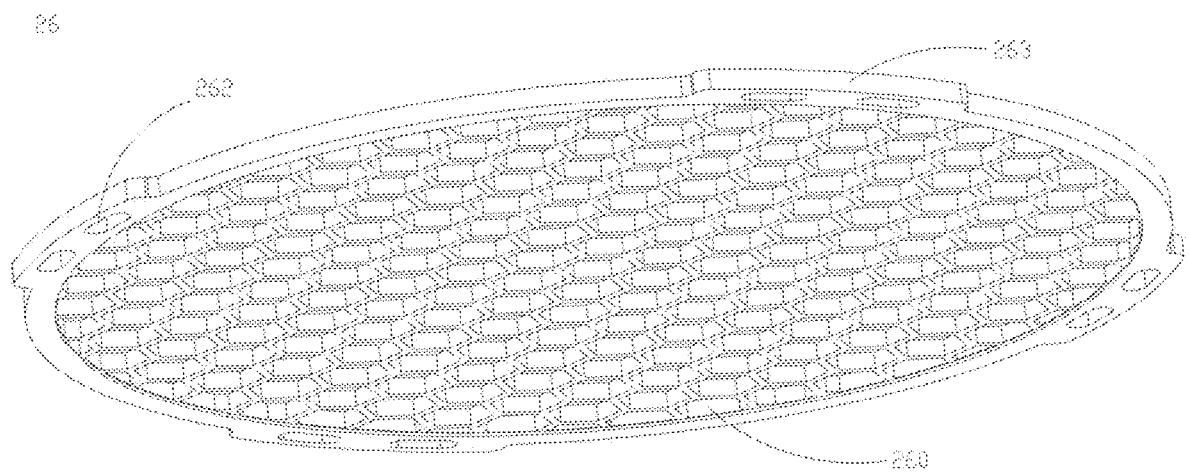
FIG. 12 is a schematic structural diagram of an isolation net of a foldable handheld fan according to the present invention.
Figure 13:
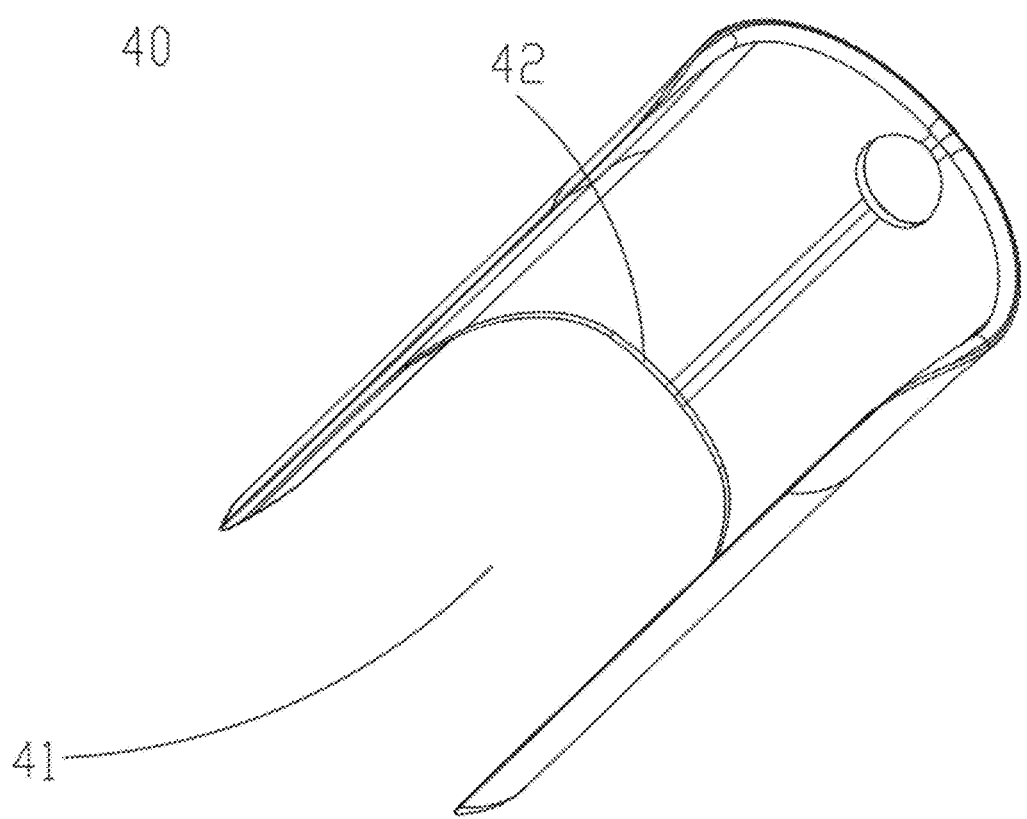
FIG. 13 is a schematic structural diagram of a support member of a foldable handheld fan according to the present invention.

Referring to FIG. 6 and FIG. 12, the first shell 23 is equipped with an isolation net 26. The isolation net 26 is positioned at the air inlet opening 21. An inner wall of the first shell 23 is provided with a first protruding platform 232. The isolation net 26 is installed between the first protruding platform 232 and the third shell 25. In this embodiment, by arranging the isolation net 26, external objects are prevented from entering the interior of the foldable handheld fan and interfering with the operation of the foldable handheld fan, and the user can also be protected from being in direct contact with the fan blade component 27 inside the fan head 20 and being hurt.

Referring to FIG. 12, the isolation net 26 is a metal mesh. A plurality of air inlet holes 260 are defined in the the isolation net 26. The plurality of air inlet holes 260 are used for reducing wind resistance and increasing air intake. Each of the air inlet holes 260 can be circular, and the plurality of air inlet holes 260 can be identical in diameter. An inner diameter of each of the air inlet holes 260 is in a range from 0.5 mm to 4 mm. This size can prevent foreign objects from being drawn into the fan head 20. It can be understood that the isolation net 26 has a relatively thin thickness and a light weight, which is conducive to the miniaturization and light weight of the product. Furthermore, an edge of the isolation net 26 is also provided with a plurality of fixing holes 262. The plurality of fixing holes 262 are configured to correspond to a plurality of fixing columns of the third shell 25. The fixing columns extend into the fixing holes 262 to fix the isolation net 26 to the third shell 25. The isolation net 26 is also provided with a plurality of flanges 263. The fixing holes 262 are defined in the flanges 263. In the foldable handheld fan, the air inlet holes 260 of the isolation net 26 are in a regular hexagon shape, and adjacent two of the air inlet holes 260 share an identical enclosure wall. This design can allow the isolation net 26 to have the largest air inlet area, lightest weight, lowest wind resistance, and highest air intake. A width of the enclosure wall can be within a range from 0.05 mm to 2 mm.

Referring to FIGS. 1-5 and FIG. 13, as an embodiment, the foldable handheld fan further includes a support member 40. The support member 40 is rotatably connected to one end of the fan main body 10 and is positioned away from the fan head 20. The support member 40 includes a working state and a storage state. In the working state, the support member 40 cooperates with the fan main body 10 to support the foldable handheld fan. In the storage state, the support member 40 is attached to a surface of the fan main body 10. In the working state, the support member 40 cooperates with the fan main body 10, and a free end of the support member 40 and a bottom portion of the fan main body 10 respectively serve as support, so as to support the foldable handheld fan to be placed on a plane (such as a desktop). In the storage state, the support member 40 is attached to a surface of the foldable handheld fan, which can ensure that the overall volume of the foldable handheld fan is relatively small in the storage state. The foldable handheld fan of the present application is placed on a plane. In a first method, the foldable handheld fan is placed on the plane through the bottom portion of the fan main body 10. In a second method, the foldable handheld fan is placed on the plane through the cooperation of the fan main body 10 and the support member 40. By arranged the support member 40, the foldable handheld fan can be placed in various ways, thereby improving the practicality of the foldable handheld fan.

Referring to FIGS. 1-6 and FIG. 13, as an embodiment, the fan main body 10 is provided with an accommodating slot 11 for accommodating the support member 40. In the storage state, the support member 40 is stored in the accommodating slot 11 and is attached to the fan main body 10. In this embodiment, the accommodating slot 11 is used for storing the support member 40. Specifically, the fan main body 10 is arranged in a cylindrical shape, and the support member 40 is arranged in an arc shape, so that a fitting effect is better, and the product is more aesthetically pleasing.

As an embodiment, the support member 40 is provided with a support opening 41 and an abutting portion 42. An inner wall of the support opening 41 is rotatably connected to the fan main body 10 to allow the support member 40 to rotate around the fan main body 10. The abutting portion 42 is used for abutting against the fan main body 10. The abutting portion 42 abuts against a surface of the fan main body 10, thereby keeping the support member 40 in a stable state to support the foldable handheld fan. Specifically, the support member 40 is stored in the accommodating slot 11. When the user needs to place the foldable handheld fan on a plane, the user rotates the support member 40 counterclockwise around the fan main body 10 until the abutting portion 42 of the support member 40 abuts against the fan main body 10. At this point, a direction of the support member 40 corresponds to a direction of the air inlet opening 21 of the fan head 20, and the support member 40 enters the working state. A cross-section of the support member 40 is arc-shaped, and at least one part of a cross-section of the fan main body 10 is arc-shaped, so that the fitting effect is better, and the overall appearance of the foldable handheld fan is aesthetically pleasing.

The fan main body 10 is equipped with an inclined portion 14. The inclined portion 14 is positioned at a bottom portion of the fan main body 10 away from the fan head 20. The inclined portion 14 is positioned away from the accommodating slot 11. In this embodiment, the inclined portion 14 is arranged away from the accommodating slot 11 and cooperates with the support member 40 in the working state. The inclined portion 14 and the free end of the support member 40 serve as two support parts for supporting the foldable handheld fan. The inclined portion 14 increases a contact area between the foldable handheld fan and a plane, thereby improving the stability of placing the foldable handheld fan. By arranging the inclined portion 14 and the support member 40, the foldable handheld fan has a plurality of placement methods and is suitable for various placement environments (such as uneven and continuous planes), and the placement methods are more flexible, thereby improving the practicality of the foldable handheld fan.

Referring to FIGS. 1-6, one surface of the fan main body 10 opposite to the fan head 20 forms an inner groove 12. The inner groove 12 is positioned below the storage space 31 and is in communication with the storage space 31. The inner groove 12 is used for at least one part of the fan head 20 to pass through. In this embodiment, the inner groove 12 is formed on the surface of the fan main body 10 opposite to the fan head 20. When the fan head 20 rotates, at least one part of the fan head 20 passes through the inner groove 12. While ensuring the normal rotation of the fan head 20, a gap between the fan head 20 and the fan main body 10 in the first direction is smaller, thereby making the overall height of the foldable handheld fan lower, and ensuring a small space occupation and convenient portability.

As an embodiment, the foldable handheld fan further includes a control component 50 and a power supply component 60. The power supply component 60 is used for supplying power to the fan head 20 and the control component 50. The control component 50 includes a control button 51, a lighting component 52, an indicator component 53, and a circuit board 54. The circuit board 54 is electrically connected to the control button 51, the lighting component 52, the indicator component 53, and the power supply component 60. A cavity is defined in the fan main body 10. The circuit board 54 and the power supply component 60 are installed in the cavity. The control button 51, the lighting component 52, and the indicator component 53 are installed on the fan main body 10. In this embodiment, the power supply component 60 is used for providing electrical energy to the control component 50. The power supply component can be a disposable battery, and can also be a rechargeable battery. Correspondingly, the fan main body 10 is also equipped with a charging interface 61 (such as a Type-C charging interface) for the user to charge. The control button 51 is capable of controlling the foldable handheld fan to be turned on or off, and to be switched to different wind speed levels. Different wind speed levels correspond to different wind intensities. For example, by pressing the control button 51 once, the foldable handheld fan is switched to a first level; by pressing the control button 51 twice, the foldable handheld fan is switched to a second level; by long-pressing the control button 51, the foldable handheld fan is turned on or off, and there is no limitation here. The indicator component 53 is an indicator lamp. The indicator lamp can be used for indicating the power on and off, wind speed levels, battery levels of the handheld fan, etc., which is not limited herein. For example, a total number of the indicator lamps is two. When the handheld fan is turned on, the two indicator lamps are lit up simultaneously, indicating that the handheld fan is turned on. When the handheld fan is turned off, the two indicator lamps are turned off simultaneously. Alternatively, the total number of the indicator lamps is three, and when the battery level of the fan is at 100%, the three indicator lamps are lit up simultaneously. When the battery level of the fan is 100%-50%, two indicator lamps are lit up simultaneously. When the battery level of the fan is 50%-0%, one indicator lamp is lit up. When the battery level is depleted, all indicator lamps are off. Referring to FIG. 6, the fan main body 10 is equipped with the control button 51. In this embodiment, the fan main body 10 is hollow, and is used for the installation of the power supply component 60 and the circuit board 54 connected to the power supply component 60. The circuit board 54 is connected to the control button 51 to receive a power-on signal from the control button 51, causing the motor 270 of the fan blade component 27 to rotate, thereby driving the fan blade 271 to rotate. The circuit board 54 also receives a power-off signal from the control button 51, causing the motor 270 of the fan blade component 27 to stop rotating, thereby stopping the fan blade 271 from rotating. In this embodiment, a wire connected to the motor 270 can enter the connecting arm 32 through the fan main body 10 and then be electrically connected to the power supply component 60.

As an embodiment, the foldable handheld fan further includes a hanging portion 13 provided on the fan main body 10. The hanging portion 13 is used for hanging with a rope, making it easier for the user to carry the foldable handheld fan.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A foldable handheld fan, comprising:
a fan main body;
a fan head connected to the fan main body; and
a connecting component installed on the fan main body;
wherein the connecting component is provided with a storage space, and the storage space is positioned above the fan main body; the fan head is rotatably connected to the connecting component, and the fan head comprises a storage state and a working state; in the storage state, at least one part of the fan head is stored in the storage space; the fan head is also rotatable relative to the connecting component in the storage state to enter the working state; and in the working state, the fan head is capable of blowing air outwards;
wherein the fan head comprises a fan blade component and a housing surrounding the fan blade component therein, the housing is provided with an air inlet opening and an air blowing opening in communication with the air inlet opening; in the storage state, the fan head is longitudinally aligned with the fan main body, with the air inlet opening, the air blowing opening, and the fan main body being positioned on an identical axis, and the air inlet opening being nearer to the fan main body relative to the air blowing opening; and in the working state, the fan head is transversely placed on the fan main body, with a central axis of the housing being perpendicular to a central axis of the fan main body;
wherein the housing at least comprises a first shell and a second shell connected to the first shell; the air inlet opening is positioned in the first shell; and the air blowing opening is positioned in the second shell;
the second shell comprises a second outer shell and a second inner shell; the second outer shell is hollow; the second inner shell is positioned inside the second outer shell; the second inner shell and the second outer shell are connected by a plurality of spaced first isolation members; and the first isolation members divide the air blowing opening into a plurality of first air blowing outlets; and
wherein the housing further comprises a third shell installed between the first shell and the second shell;
the third shell comprises a third outer shell and a third inner shell; the third outer shell is hollow; the third inner shell is positioned inside the third outer shell; the third inner shell and the third outer shell are connected by a plurality of spaced second isolation members; and a plurality of second air blowing outlets are formed by the second isolation members;
the first air blowing outlets in the second shell are defined opposite to the second air blowing outlets in the third shell.

2. The foldable handheld fan according to claim 1, wherein the fan blade component is provided with a blade fixing column; a surface of the second inner shell extends towards a direction of the third inner shell to form a second fixing member; the third inner shell is provided with a third fixing hole; the second fixing member penetrates into the third fixing hole; and the blade fixing column passes through the third fixing hole and is connected to the second fixing member.

3. The foldable handheld fan according to claim 2, wherein the second inner shell is equipped with a second positioning component; the third inner shell is equipped with a third positioning component; and the second positioning component is inserted into the third positioning component, so as to limit axial rotation of the second inner shell relative to the third inner shell.

4. The foldable handheld fan according to claim 3, wherein the second positioning component comprises two second positioning members; the two second positioning members are symmetrically arranged on both sides of the second fixing member; each of the second positioning members is U-shaped; an opening of each of the second positioning members is oriented towards the second fixing member; each of the second positioning members comprises a second bottom plate connected to an inner wall of the second inner shell, and two second side plates installed at both ends of the second bottom plate; and the two second side plates and the second bottom plate form the U-shaped second positioning member.

5. The foldable handheld fan according to claim 4, wherein the second side plates are connected to the second inner shell through a second positioning block; an avoidance notch is defined in the third inner shell; and the avoidance notch is used for assembly of the second positioning block.

6. The foldable handheld fan according to claim 3, wherein the third positioning component comprises two third positioning members; the two third positioning members are symmetrically arranged on both sides of the third fixing hole; each of the third positioning members is U-shaped; an opening of each of the third positioning members is oriented towards the third inner shell; each of the third positioning members comprises a third bottom plate and two third side plates; one side of each of the two third side plates is connected to the third bottom plate; and an opposite side of each of the two third side plates is connected to the third inner shell.

7. The foldable handheld fan according to claim 1, wherein the third outer shell is provided with a plurality of serrations on one side facing the first shell; the first shell is provided with first through holes cooperating with the serrations; and the serrations are engaged with the first through holes.

8. The foldable handheld fan according to claim 1, wherein the first shell is equipped with an isolation net; the isolation net is positioned at the air inlet opening; an inner wall of the first shell is provided with a first protruding platform; and the isolation net is installed between the first protruding platform and the third shell.

9. The foldable handheld fan according to claim 1, wherein the connecting component comprises two connecting arms installed on the fan main body; the two connecting arms are arranged opposite each other; and the two connecting arms and the fan main body form the storage space.

10. The foldable handheld fan according to claim 9, wherein one of the connecting arms and the fan head is provided with a connecting member, the other of the connecting arms and the fan head is provided with a connecting hole, and the connecting member penetrates into the connecting hole, so that the connecting arms and the fan head are rotatably connected.

11. The foldable handheld fan according to claim 9, wherein one surface of the fan main body opposite to the fan head forms an inner groove; the inner groove is positioned below the storage space and is in communication with the storage space; and the inner groove is used for at least part of the fan head to pass through.

12. The foldable handheld fan according to claim 1, further comprising a control component and a power supply component, wherein the power supply component is used for supplying power to the fan head and the control component; the control component comprises a control button, a lighting component, an indicator component, and a circuit board; the circuit board is electrically connected to the control button, the lighting component, the indicator component, and the power supply component; a cavity is defined in the fan main body; the circuit board and the power supply component are installed in the cavity; and the control button, the lighting component, and the indicator component are installed on the fan main body.

13. A foldable handheld fan, comprising:
a fan main body;
a fan head connected to the fan main body;
a connecting component installed on the fan main body; and
a support member;
wherein the connecting component is provided with a storage space, and the storage space is positioned above the fan main body; the fan head is rotatably connected to the connecting component, and the fan head comprises a storage state and a working state; in the storage state, at least one part of the fan head is stored in the storage space; the fan head is also rotatable relative to the connecting component in the storage state to enter the working state; and in the working state, the fan head is capable of blowing air outwards;
wherein the support member is rotatably connected to one end of the fan main body and is positioned away from the fan head; in the working state, the support member cooperates with the fan main body to support the foldable handheld fan; and in the storage state, the support member is attached to a surface of the fan main body; and
wherein the fan main body is provided with an accommodating slot for accommodating the support member; and in the storage state, the support member is stored in the accommodating slot and is attached to the fan main body.

14. The foldable handheld fan according to claim 13, wherein the support member is provided with a support opening and an abutting portion; an inner wall of the support opening is rotatably connected to the fan main body to allow the support member to rotate around the fan main body; and the abutting portion is used for abutting against the fan main body.

15. The foldable handheld fan according to claim 14, wherein the fan main body is equipped with an inclined portion; the inclined portion is positioned at a bottom portion of the fan main body away from the fan head; and the inclined portion is positioned away from the accommodating slot.

16. A foldable handheld fan, comprising:
a fan main body;
a fan head connected to the fan main body; and
a connecting component installed on the fan main body;
wherein the connecting component is provided with a storage space, and the storage space is positioned above the fan main body; the fan head is rotatably connected to the connecting component, and the fan head comprises a storage state wherein at least one part of the fan head is stored in the storage space, and the fan head is also rotatable relative to the connecting component in the storage state to enter a working state; and the fan head is able to rotate to the working state to be capable of blowing air outwards, with a central axis of the fan head towards a direction in the working state being perpendicular from a central axis of the fan main body; and
wherein the connecting component comprises two connecting arms installed on the fan main body; the two connecting arms are arranged opposite each other; and the two connecting arms and the fan main body form the storage space;
where one surface of the fan main body opposite to the fan head forms an inner groove; the inner groove is positioned below the storage space and is in communication with the storage space; and the inner groove is used for at least part of the fan head to pass through.

17. The foldable handheld fan according to claim 16, wherein the fan head comprises a fan blade component and a housing surrounding the fan blade component therein, the housing is provided with an air inlet opening and an air blowing opening in communication with the air inlet opening; in the storage state, the fan head is longitudinally aligned with the fan main body, with the air inlet opening, the air blowing opening, and the fan main body being positioned on an identical axis, and the air inlet opening being nearer to the fan main body relative to the air blowing opening; and in the working state, the fan head is transversely placed on the fan main body, with the central axis of the housing being perpendicular to the central axis of the fan main body.

\* \* \* \* \*